United States Patent Office 2,767,952
Patented Oct. 23, 1956

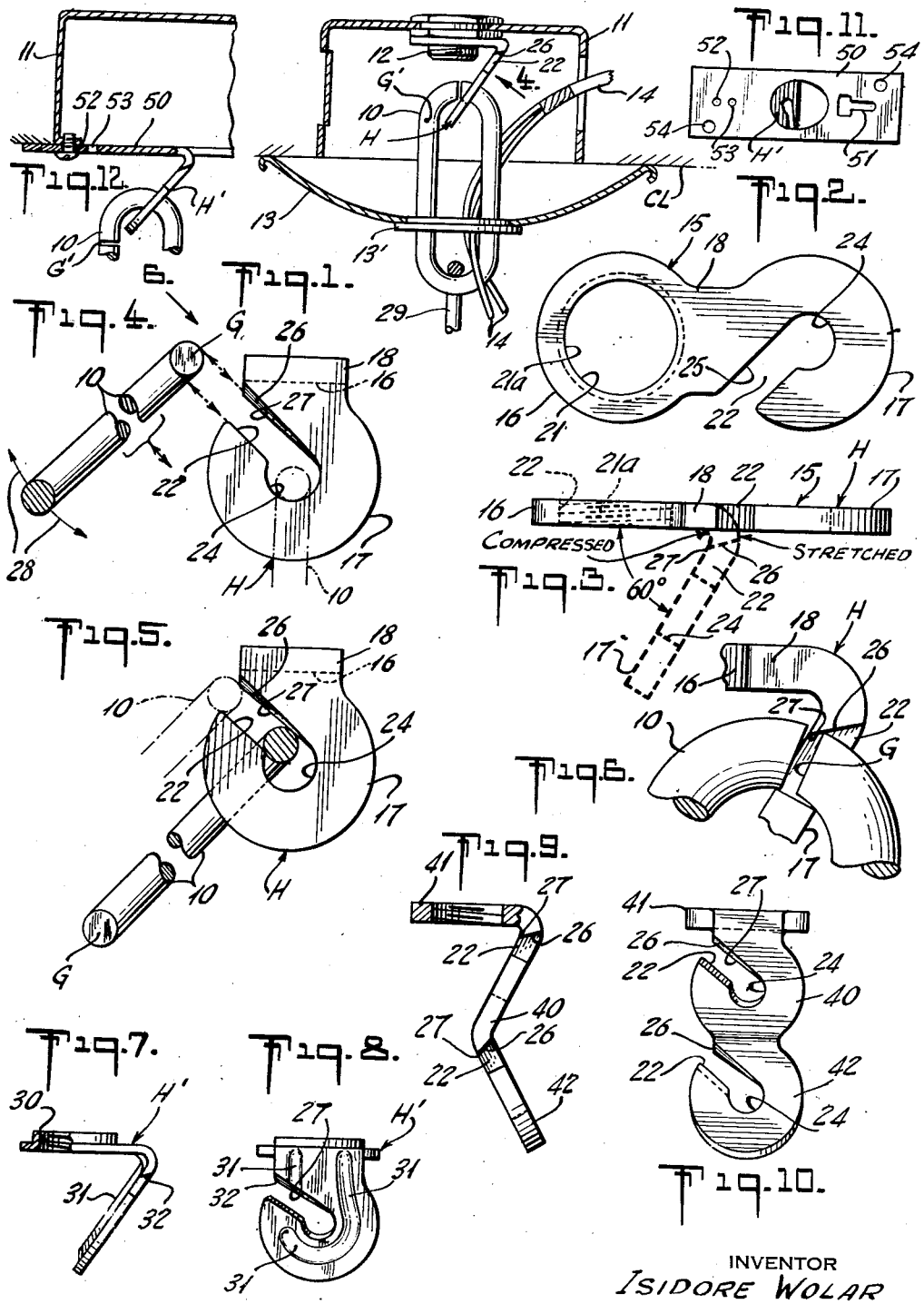

2,767,952

CHAIN TYPE LIGHTING FIXTURE HANGERS

Isidore Wolar, Mount Vernon, N. Y.

Application January 29, 1953, Serial No. 333,935

5 Claims. (Cl. 248—339)

The present invention relates to chain type lighting fixture hangers.

The usual holders employed for hanging chain type lighting fixtures include a multiplicity of parts such as cast hickies, nipples, lock nuts, cast loops, threaded rings and the like, all of which contribute to the cost of the installation. According to the present invention, the uppermost link of the chain is directly supported from a hook and the chain and hook are interrelated in such a manner that normally the chain hangs down from the hook in a position from which the accidental removal of the chain from the hook is impossible.

According to the present invention, the hook has a configuration which makes it possible to readily place the link in position on the hook or remove it from the hook whenever desired. The position for placing the link on the hook is a position which is not normally assumed by the chain when the fixture is hanging and one into which it can not be accidentally shifted.

According to the present invention, the chain link employed may be the usual standard straight chain link provided by bending wire rod stock to shape to form the link, and leave it open, i. e., with a small gap, where the ends of the wire stock are close together but not welded. The present invention contemplates a special hook adapted to be secured to the outlet box, and this hook has a configuration which admits the link only when the gap is properly positioned, and which will not permit the removal of the link when it is hanging down.

The accompanying drawings show, for purposes of illustrating the present invention, four embodiments in which the invention may take form, it being understood that the drawings are illustrative of the invention rather than limiting the same.

In the accompanying drawings:

Figure 1 is a vertical sectional view showing the suspension of a lighting fixture from an outlet box;

Figures 2 and 3 are plan and side elevational views, showing the blank used in making the hook;

Figure 4 is an elevational view at an enlarged scale taken in a diagonal direction of the arrow 4 of Figure 1, showing the open-ended link being inserted into or removed from the hook;

Figure 5 is a view similar to Figure 4, showing the open-ended link in the hook and reversed end for end where it is non-removable;

Figure 6 is a fragmentary enlarged view at a still greater scale, taken in the direction of the arrow 6 of Figure 4;

Figures 7 and 8 are elevational views at right angles to each other showing a hook similar to Figures 1, 3, 4 and 5, but made of thin section metal;

Figures 9 and 10 are elevational views taken at right angles to each other showing a double hook;

Figure 11 is an inverted plan view of a strap in which the hook is formed; and

Figure 12 is a fragmentary view illustrating the strap mounted on an outlet box.

Figure 1 illustrates the lighting fixture chain suspended from an outlet box. The upper link of the chain is indicated at 10, the outlet box at 11, the outlet box stud at 12, and the hook member, or hickey is indicated generally by the letter H. The upper link 10 hangs vertically downward from the hook member and may support a canopy 13 in any suitable manner. Wiring 14 passes from the outlet box down through the canopy support 13′ and to the fixture, now shown.

The hickey, or hook member H is formed from a sheet metal blank 15, approximately ⅛″ thick, such as shown in Figures 2 and 3. It has a ringlike end 16 and a hook end 17 connected together by relatively narrow neck 18. This blank is stamped out to have hole 21 at one end of the right size to be threaded to fit about the outlet box stud, the other end of the blank is punched to have a slot 22 which extends diagonally away from the narrowed interconnecting section 18 at the middle of the blank. The inner end 24 of the slot is larger than the outer end of the slot. The width of the slot 22 in the blank is critically related to the diameter of the rod stock from which the chain link is made.

After the blank has been stamped out to shape as shown in Figures 2 and 3 in full lines and threaded as indicated in 21a, Figure 3, the blank is bent sharply to bring the right-hand portion of the blank down under the left-hand portion as indicated in heavy dotted lines in Figure 3. The included angle between the two portions is approximately 60°. During the bending process, the upper or left wall 25 of the slot 22, which in the blank was at right angles to the faces of the blank, has now assumed an oblique position with respect to the perpendicular to the face of the blank as is indicated at 26 in Figures 3 to 6. The acute angle edge is indicated at 27. This reshaping is brought about by the compression which takes place on the inside of the blank and the stretching which takes place at the outside of the blank. This operation effectively narrows the width of the slot.

When the hickey or hook member is secured to the outlet box stud, the bent hook portion 17 extends downwardly and inwardly under the outlet box stud, and the slot 22 extends obliquely upwardly from its bottom 24. This stud may be at various elevations with respect to ceiling line CL depending upon the type of outlet box employed and depending on how well it is lined up with the ceiling line.

The hook can only receive the link 10 when this link is in proper position as indicated in Figures 4, 5, and 6. The link is brought to a position to which the gap G between the ends of the rod stock forming the link is aligned with the acute angle edge formed by surface 26 and the upper surface of the hook member. When these two parts are in relative position as indicated in Figures 4–6, the link can be passed into the hook because the relatively sharp edge provided by the sloping surface 26 is able to enter into the gap between the ends of the link stock. The arcs 28 indicate that the link can pivot about the point of contact. The gap is very narrow but sufficient to accept the edge referred to and allow the link to pass in. Even in the absence of a gap, the knife-like edge will spread the link. When the link is in place and released, it will hang down as indicated in Figure 1. It cannot then be dislodged from the hook because any lifting force then will bring the body of the link against the narrow opening which prevents passage of the link.

The link may be of the type which has the gap G at the end or of the type which has the gap at the point marked G′, Figure 1, in which case the link position for entering the slot is correspondingly shifted. Each of these forms of link is in common use. Should the link 10 be turned end for end, as indicated in Figure 5, it is impossible to manipulate the parts to permit removal of the link from the hook. When the link is in this reversed position as in Figure 5, the chain link cannot be passed into the hook. As the lower links 28 of the chain are of smaller gage material, any such link can be placed on the hook for temporary support of the fixture while wiring it in.

In the form shown in Figures 7 and 8, hook or hanger H' resembles the one shown in Figures 1–6, except that it is made out of thinner stock metal. It is drawn upwardly as indicated at 30 and threaded to fit the outlet box stud and it is provided with stiffening ribs 31 in the hook forming portion. The acute angle portion adapted to enter the gap in the link is indicated at 32.

In the form shown in Figures 9 and 10, the device is provided with two hooks, the upper hook 40 and the upper portion 41 of the hickey or hook member being the same discussed above in detail. The lower portion 42 is the same as the portion 40 except that it is bent back so as to be under the portion 40 when in normal position. This device is suitable for use where an extension might be necessary to accommodate the single hook device shown in Figures 1–8. Here the double hook device can be used to support the upper link of the chain at greater distance from the outlet box stud than the constructions of Figures 1–8. If a shorter hook is desired, the electrician can cut or break off the lower end 42.

In the arrangement shown in Figures 11 and 12, the hook H' is like the hook H above discussed, but instead of being formed by bending a strap-like blank, it is struck out of a flat strap 50. This strap is made long enough to span an outlet box and has a T-shaped slot 51 and holes 52, 53 to accommodate the screws 54 used to secure the strap to the box. The strap is provided with holes 54, 54 for securing it directly to a ceiling, beam, or other support.

Since it is obvious that the invention may be embodied in other forms and constructions within the scope of the claims, I wish it to be understood that the particular forms shown are but a few of these forms, and various modifications and changes being possible, I do not otherwise limit myself in any way with respect thereto.

What is claimed is:

1. A lighting fixture hanger to be used with a standard lighting fixture chain link or round cross section and having a gap, said hanger including a hook member having an upper normally horizontal portion and a downwardly and inwardly sloping, generally flat lower portion having an upper face and a lower face and provided with an obliquely disposed upwardly opening slot of greater dimension at the bottom than at the open end thereof, the open end of the slot having an upper wall at an acute angle to the plane of the upper face of the said lower portion, the slot width as determined by said acute angled edge of the upper wall being less than the diameter of the stock used in such standard straight lighting fixture chain link.

2. A lighting fixture comprising a chain-link of the straight link type having the ends of the stock used in forming the link closely abutting one another but forming a narrow gap, and a link supporting hook member normally obliquely disposed and having an obliquely upwardly opening slot of narrower width near its open end than the diameter of the stock from which the link is formed to normally prevent passage of the link in either direction through the slot, the upper wall of the slot forming with the adjacent upper faces of the hook member an acute angled edge receivable by the gap in the link when the link is disposed in a position to have the gap in the plane of said upper wall, whereby the link can be placed in the hook slot or removed therefrom, the lower end of the hook slot being enlarged so that the link hangs freely.

3. A lighting fixture as in claim 2, wherein the hook member has a normally horizontal portion above the slot and apertured for securement to an outlet box stud, the bottom of the hook slot being adjacent the normally vertical axis of the aperture.

4. A lighting fixture hanger to be used with a standard lighting fixture chain link of round cross section and having a gap, said hanger including a hook member having an upper normally horizontal portion apertured for securement to an outlet box stud and a downwardly and inwardly sloping, generally flat lower portion having an upper face and a lower face and provided with an obliquely disposed upwardly opening slot of greater dimension at the bottom than at the open end thereof, the open end of the slot having an upper wall at an acute angle to the plane of the upper face of the said lower portion, the slot width as determined by said acute angled edge of the upper wall being less than the diameter of the stock used in such standard straight lighting fixture chain link.

5. A lighting fixture hanger to be used with a standard lighting fixture chain link of round cross section and having a gap, said hanger including a hook member having an upper normally horizontal portion of a length to bridge an outlet box provided with holes to accept outlet box fastening screws and a downwardly and inwardly sloping, generally flat lower portion having an upper face and a lower face and provided with an obliquely disposed upwardly opening slot of greater dimension at the bottom than at the open end thereof, the open end of the slot having an upper wall at an acute angle to the plane of the upper face of the said lower portion, the slot width as determined by said acute angled edge of the upper wall being less than the diameter of the stock used in such standard straight lighting fixture chain link.

References Cited in the file of this patent

UNITED STATES PATENTS

| | | |
|---|---|---|
| 632,584 | Oehring | Sept. 5, 1899 |
| 1,448,942 | Rockey | Mar. 20, 1923 |
| 1,514,544 | Lang | Nov. 4, 1924 |
| 1,882,312 | Aspinwall | Oct. 11, 1932 |
| 1,985,582 | Schwinger | Dec. 25, 1934 |
| 2,030,960 | Burns | Feb. 18, 1936 |
| 2,500,706 | Roshko | Mar. 14, 1950 |
| 2,509,895 | Wakefield | May 30, 1950 |
| 2,545,564 | Appleton | Mar. 20, 1951 |